UNITED STATES PATENT OFFICE.

RUDOLF SCHMITT AND CARL KOLBE, OF DRESDEN, SAXONY, GERMANY, ASSIGNORS TO DR. F. VON HEYDEN, NACHFOLGER, OF RADEBEUL, NEAR DRESDEN, SAXONY, GERMANY.

MANUFACTURE OF NAPHTHOL-CARBONIC ALKALINE SALTS.

SPECIFICATION forming part of Letters Patent No. 350,468, dated October 5, 1886.

Application filed July 9, 1886. Serial No. 207,577. (No specimens.) Patented in Germany September 19, 1884, No. 31,240, and in England May 19, 1885, No. 6,134.

*To all whom it may concern:*

Be it known that we, RUDOLF SCHMITT and CARL KOLBE, both of Dresden, in the Kingdom of Saxony, Empire of Germany, have invented certain new and useful Improvements in the Process for the Production of Alpha or Beta Carbonaphthol-Acid Alkaline Salts, of which the following is a specification.

This invention relates to the manufacture of naphthol-carbonic $\frac{C_{10}H_6(OH)}{COOH}$ alkaline salts by the action of dry carbonic acid upon naphthol alkaline salts, as hereinafter explained, and also to their subsequent treatment for the production of alpha or beta carbonaphthol-acid alkaline salts, as specified herebelow under heads 1, 2, and 3, and to a modification of this manufacture, as specified under head 4.

We have ascertained that carbonaphthol acids (oxynaphthoic acids) may be obtained by means of processes similar to those described in the specification of United States Patent No. 334,290, dated January 12, 1886, for the production of salicylic acid. This result is obtained by proceeding according to the methods next hereinafter described.

1. When the dry alkaline salts of alpha or beta naphthol are treated with dry carbonic acid at ordinary temperature, there are formed, so long as absorption takes place, alkaline salts of the acid carbonic alpha or beta naphthol ethers. The following equation may be given as an illustration of the formation of the sodium salts:

$$C_{10}H_7ONa + CO_2 = C_{10}H_7OCOONa.$$

When this salt is heated in an air-tight digester for a few hours at a temperature of from about 120° to 140° centigrade, it becomes molecularly transformed or converted into the simple alkaline salt of the alpha and beta carbonaphthol acid. The equation showing how the conversion or transposition of sodium naphthol carbonate into the corresponding sodium salt of carbonaphthol acid takes place may be taken as an example of this process:

$$C_{10}H_7OCOONa = C_{10}H_6\left(\begin{array}{c}OH\\COONa\end{array}\right).$$

There is no excess of pressure on opening the vessel. The absolutely-dry pulverulent salts are dissolved in water. The free acid is precipitated by means of a mineral acid and purified by crystallization in the usual manner.

2. The alkaline salts of the alpha and beta naphthol are quickly dried and placed in an autoclave, or vessel with a tight-fitting cover, into which dry carbonic acid is then pumped as long as may be necessary for the formation of the alkalinaphthol carbonate. The vessel (that is to say, the inlet-pipe admitting the carbonic acid into the vessel) is then closed as long as the carbonic acid is not entirely absorbed and no excess of pressure is present. The mass is then allowed to remain in the vessel, being frequently stirred, for a few hours, in order to admit of the complete conversion of the naphthol salt into naphthol-carbonic salt, after which the vessel is heated to from about 120° to 140° centigrade in order to effect the conversion into simple alpha or beta carbonaphthol-acid salt.

3. Dry alkalinaphthol salts are placed in an autoclave, and sufficient solid carbonic acid is thrown in to produce the formation of the naphthol-carbonic alkaline salt. The apparatus is then quickly closed and the operation proceeded with as hereinbefore described under the second method.

4. The above-specified methods may be simplified or modified in such manner that the process, instead of being carried out in two stages, may be carried out in one stage only. This is done by allowing the carbonic acid to react upon the alkaline salts of naphthol under pressure at a temperature (of these salts) of 120° to 145° Celsius. In this modification the alkaline salts of the acid carbonic-naphthol ethers are converted in the nascent condition into the respective carbonaphthol-acid salts.

Having now particularly described and ascertained the nature of the said invention and in what manner the same is to be performed, we declare that what we claim is—

1. The process for the manufacture of naphthol-carbonic alkaline salts by the action of dry carbonic acid at atmospheric temperature, either without pressure or under pressure in conjunction with a cooling process, upon naphthol alkaline salts, and converting the dry naphthol-carbonic alkaline salts thus obtained into alpha or beta carbonaphthol-acid alkaline salts by heating in air-tight apparatus to from about 120° to 140° centigrade, substantially as hereinbefore described.

2. The process for the direct production of carbonaphthol acid salts by the reaction of carbonic acid upon the alkaline salts of alpha or beta naphthol under pressure at a temperature of 120° to 145° centigrade, substantially as herein described.

In testimony that we claim the foregoing as our invention we have signed our names in presence of two subscribing witnesses.

RUDOLF SCHMITT.
CARL KOLBE.

Witnesses:
WILHELM WILDENHÜTTER,
GEORG RICHTER.